United States Patent
Xie et al.

(10) Patent No.: US 10,932,126 B2
(45) Date of Patent: Feb. 23, 2021

(54) METHOD FOR UNLOCKING SIM CARD AND MOBILE TERMINAL

(71) Applicant: JRD Communication (Shenzhen) LTD., Shenzhen (CN)

(72) Inventors: Hanwu Xie, Shenzhen (CN); Xiaofen Zhong, Shenzhen (CN)

(73) Assignee: JKD Communication (Shenzhen) LTD., Shenzhen (CN)

( * ) Notice: Subject to any disclaimer, the term of this patent is extended or adjusted under 35 U.S.C. 154(b) by 0 days.

(21) Appl. No.: 16/769,602

(22) PCT Filed: Dec. 6, 2018

(86) PCT No.: PCT/CN2018/119503
§ 371 (c)(1),
(2) Date: Jun. 4, 2020

(87) PCT Pub. No.: WO2019/109968
PCT Pub. Date: Jun. 13, 2019

(65) Prior Publication Data
US 2020/0322790 A1    Oct. 8, 2020

(30) Foreign Application Priority Data

Dec. 6, 2017  (CN) .......................... 201711275832.4

(51) Int. Cl.
*H04W 12/00* (2009.01)
*H04M 1/673* (2006.01)
(Continued)

(52) U.S. Cl.
CPC ......... *H04W 12/004* (2019.01); *H04M 1/673* (2013.01); *H04W 8/22* (2013.01);
(Continued)

(58) Field of Classification Search
CPC ....... H04W 12/004; H04W 8/22; H04W 8/26; H04W 8/18; H04W 8/205; H04M 1/673; H04L 9/0631; H04L 9/0643
See application file for complete search history.

(56) References Cited

U.S. PATENT DOCUMENTS

2004/0005912 A1* 1/2004 Hubbe ................. H04W 12/06
455/558
2011/0081950 A1   4/2011 Guven
(Continued)

FOREIGN PATENT DOCUMENTS

CN   101026834    8/2007
CN   103152724    6/2013
(Continued)

OTHER PUBLICATIONS

International Search Report and the Written Opinion dated Feb. 27, 2019 From the International Searching Authority Re. Application No. PCT/CN2018/119503 and Its Translation of Search Report Into English. (9 Pages).

*Primary Examiner* — Marisol Figueroa

(57) ABSTRACT

A method for unlocking a SIM card includes: determining, by a mobile terminal, whether a currently inserted SIM card belongs to a preset SIM card in compliance with a specific operator; controlling the mobile terminal to access a network normally if yes; detecting lock information of an IMSI corresponding to the SIM card if no; limiting the SIM card to access the network when the lock information of the IMSI exists and a lock type of the IMSI is a lock state; and controlling the mobile terminal to access the network normally when the lock information of the IMSI exists and the lock type of the IMSI is an unlock state. A mobile terminal is also provided.

18 Claims, 3 Drawing Sheets

(51) Int. Cl.
*H04W 8/26* (2009.01)
*H04W 8/22* (2009.01)
*H04L 9/06* (2006.01)

(52) U.S. Cl.
CPC ............ *H04W 8/26* (2013.01); *H04L 9/0631* (2013.01); *H04L 9/0643* (2013.01)

(56) References Cited

U.S. PATENT DOCUMENTS

2012/0289197 A1* 11/2012 Holtmanns ..... H04W 12/00409
455/411
2015/0099485 A1* 4/2015 Chuang ................. H04W 8/183
455/411

FOREIGN PATENT DOCUMENTS

| | | |
|---|---|---|
| CN | 106412870 | 2/2017 |
| CN | 108093392 | 5/2018 |
| CN | 103152724 | 3/2020 |
| WO | WO 2019/109968 | 6/2019 |

* cited by examiner

METHOD FOR UNLOCKING SIM CARD AND MOBILE TERMINAL

This application is a National Phase of PCT Patent Application No. PCT/CN2018/119503 having International filing date of Dec. 6, 2018, which claims the benefit of priority of Chinese Patent Application No. 201711275832.4 filed on Dec. 6, 2017. The contents of the above applications are all incorporated by reference as if fully set forth herein in their entirety.

FIELD AND BACKGROUND OF THE INVENTION

The present disclosure relates to a technology field of mobile communications, and more particularly to a method for unlocking a SIM card and a mobile terminal.

As the name suggests, SIM LOCK restricts some uses of a SIM card. This restriction is implemented according to requirements of an operator. SIM cards of other operators are prohibited from being utilized in a terminal which is provided by the operator, thereby protecting self-interest and achieving an objective of restricting competitors. Currently, there exist several SIM LOCK schemes including SIM LOCK implemented by a tool, SIM LOCK implemented by a network, SIM LOCK based on International Mobile Equipment Identity (IMEI) binding with a mobile terminal, and so on.

Currently, an unlock tool of SIM LOCK is the most widely used to unlock the SIM LOCK. A user of a terminal needs to obtain an unlock code first, and then the unlock of SIM LOCK can be completed only after the tool is obtained. Using the unlock tool to unlock the SIM LOCK is complicated for the user.

SUMMARY OF THE INVENTION

Embodiments of the present disclosure provide a method for unlocking a SIM card and a mobile terminal capable of helping a user to unlock the SIM card conveniently.

In a first aspect, an embodiment of the present disclosure provides a method for unlocking a SIM card, including steps of:

detecting and determining, by a mobile terminal, whether a currently inserted SIM card belongs to a preset SIM card in compliance with a specific operator;

controlling the mobile terminal to access a network normally if yes; detecting lock information of an IMSI corresponding to the SIM card if no;

limiting the SIM card to access the network when the lock information of the IMSI exists and a lock type of the IMSI is a lock state; controlling the mobile terminal to access the network normally when the lock information of the IMSI exists and the lock type of the IMSI is an unlock state;

initiating a function for locking the IMSI to generate a corresponding unlock code PCK according to an IMEI of the mobile terminal and the IMSI of the SIM card when the lock information of the IMSI does not exist; and reminding a user to input the unlock code PCK to control the mobile terminal to access the network normally when the mobile terminal detects that the SIM card is locked.

Further, before the step of, detecting and determining, by the mobile terminal, whether the currently inserted SIM card belongs to the preset SIM card in compliance with the specific operator, the method further includes:

turning on the mobile terminal and reading the IMSI of the SIM card, a PLMN, and the IMEI of the mobile terminal.

Further, the step of, controlling the mobile terminal to access the network normally if yes; detecting the lock information of the IMSI corresponding to the SIM card if no, specifically includes:

detecting and determining, by the mobile terminal, whether the lock information of the IMSI corresponding to the SIM card is stored in the mobile terminal.

Further, after the step of, initiating the function for locking the IMSI to generate the corresponding unlock code PCK according to the IMEI of the mobile terminal and the IMSI of the SIM card when the lock information of the IMSI does not exist, the method further includes:

obtaining, by the operator, the corresponding unlock code PCK and providing the corresponding unlock code PCK for the user.

Further, after the step of, initiating the function for locking the IMSI to generate the corresponding unlock code PCK according to the IMEI of the mobile terminal and the IMSI of the SIM card when the lock information of the IMSI does not exist, the method further includes:

encrypting the corresponding unlock code PCK and the lock type of the IMSI and storing the corresponding unlock code PCK and the lock type of the IMSI which are encrypted in a specific area.

In the method for unlocking the SIM card, the corresponding unlock code PCK and the lock type of the IMSI are stored in an RPMB area which is stored by a TEE system, and an encryption method is an AES algorithm.

In the method for unlocking the SIM card, the unlock code PCK is calculated and obtained by a predetermined algorithm, and the predetermined algorithm is an MD5 algorithm or an SHA-1 algorithm.

In a second aspect, an embodiment of the present disclosure provides a mobile terminal including a processor and a storage device connected to the processor, and the mobile terminal includes a SIM card installed therein;

wherein the storage device stores programs configured to unlock the SIM card, and the programs are executed by the processor to carry out the following steps of:

detecting and determining, by the mobile terminal, whether a currently inserted SIM card belongs to a preset SIM card in compliance with a specific operator;

controlling the mobile terminal to access a network normally if yes; detecting lock information of an IMSI corresponding to the SIM card if no;

limiting the SIM card to access the network when the lock information of the IMSI exists and a lock type of the IMSI is a lock state; controlling the mobile terminal to access the network normally when the lock information of the IMSI exists and the lock type of the IMSI is an unlock state;

initiating a function for locking the IMSI to generate a corresponding unlock code PCK according to an IMEI of the mobile terminal and the IMSI of the SIM card when the lock information of the IMSI does not exist; and reminding a user to input the unlock code PCK to control the mobile terminal to access the network normally when the mobile terminal detects that the SIM card is locked.

Further, before the step of, detecting and determining, by the mobile terminal, whether the currently inserted SIM card belongs to the preset SIM card in compliance with the specific operator, the programs are executed by the processor to carry out:

turning on the mobile terminal and reading the IMSI of the SIM card, a PLMN, and the IMEI of the mobile terminal.

Further, the step of, controlling the mobile terminal to access the network normally if yes; detecting the lock information of the IMSI corresponding to the SIM card if no, specifically includes:

detecting and determining, by the mobile terminal, whether the lock information of the IMSI corresponding to the SIM card is stored in the mobile terminal.

Further, after the step of, initiating the function for locking the IMSI to generate the corresponding unlock code PCK according to the IMEI of the mobile terminal and the IMSI of the SIM card when the lock information of the IMSI does not exist, the method further includes:

encrypting the corresponding unlock code PCK and the lock type of the IMSI and storing the corresponding unlock code PCK and the lock type of the IMSI which are encrypted in a specific area; and obtaining, by the operator, the corresponding unlock code PCK and providing the corresponding unlock code PCK for the user.

In the mobile terminal, the corresponding unlock code PCK and the lock type of the IMSI are stored in an RPMB area which is stored by a TEE system, and an encryption method is an AES algorithm.

In the mobile terminal, the unlock code PCK is calculated and obtained by a predetermined algorithm, and the predetermined algorithm is an MD5 algorithm or an SHA-1 algorithm.

In a third aspect, an embodiment of the present disclosure provides a method for unlocking a SIM card, including steps of:

reading an IMSI of a SIM card and detecting whether the current SIM card of a mobile terminal is a preset SIM card;

detecting whether lock information of the IMSI exists if no;

initiating a function for locking the IMSI to generate a corresponding unlock code PCK according to an IMEI of the mobile terminal and the IMSI of the SIM card when the lock information of the IMSI does not exist; and controlling the mobile terminal to access a network normally when the SIM card is locked detecting an operating frequency band of the mobile terminal when the broken slot corresponding to the first high-frequency antenna is shielded, wherein the broken slot is a broken slot between the bottom frame and the right frame;

In the method for unlocking the SIM card, the step of reading the IMSI of the SIM card and detecting whether the current SIM card of the mobile terminal is the preset SIM card further includes:

reading a PLMN and an IMEI of the mobile terminal when it is detected that the mobile terminal is turned on.

In the method for unlocking the SIM card, after the step of generating the corresponding unlock code PCK, the method further includes:

encrypting the corresponding unlock code PCK and the lock type of the IMSI and storing the corresponding unlock code PCK and the lock type of the IMSI which are encrypted in a specific area.

In the method for unlocking the SIM card of, the corresponding unlock code PCK and the lock type of the IMSI are stored in an RPMB area which is stored by a TEE system, and an encryption method is an AES algorithm In the method for unlocking the SIM card, the unlock code PCK is calculated and obtained by a predetermined algorithm, and the predetermined algorithm is an MD5 algorithm or an SHA-1 algorithm.

Advantageous effect is described as follows. In the present disclosure, the SIM card is unlocked by the unlock code PCK. An unlock tool is not required. Accordingly, it is beneficial for the user to unlock the SIM card conveniently. Furthermore, each device has a unique unlock code according to an inserted SIM card, and the unlock code is provided by an operator. As such, the present disclosure has an advantage of high safety.

DESCRIPTION OF SPECIFIC EMBODIMENTS OF THE INVENTION

The present disclosure is further described in detail in conjunction with accompanying drawings as follows.

The embodiment only explains the present disclosure but not limits the present disclosure. Those skilled in the art in the art can make modifications that have no creative contribution on this embodiment according to demands after reading the DETAILED DESCRIPTION OF EMBODIMENTS, and these modifications are protected by the patent law if they are within the scope of the claims of the present disclosure.

In the present disclosure, IMSI refers to International Mobile Subscriber Identity, IMEI refers to International Mobile Equipment Identity, and PLMN refers to Public Land Mobile Network. PCK (provider control key) refers to an unlock code.

Figure 1:
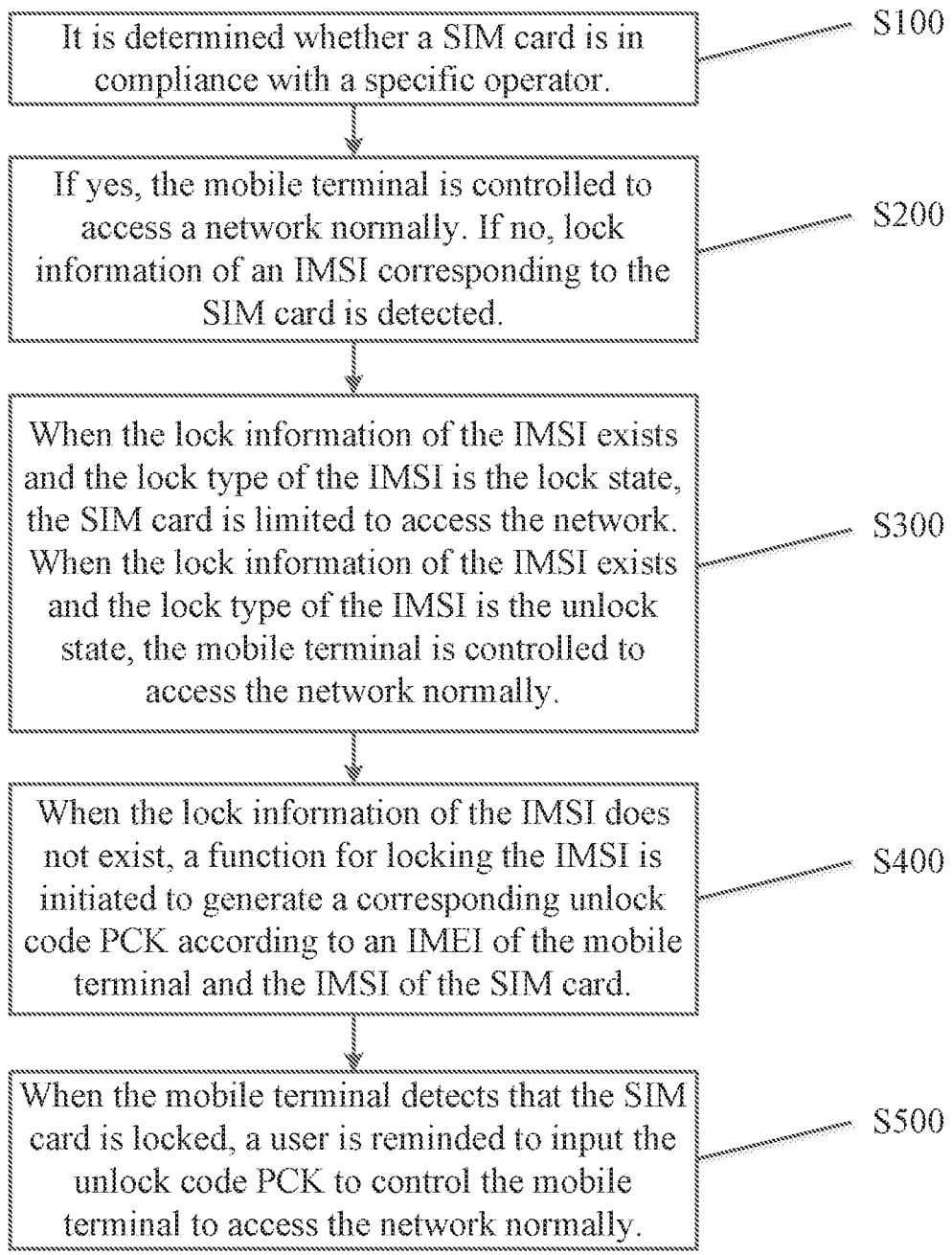
FIG. 1 illustrates a flow chart of a method for unlocking a SIM card in accordance with an embodiment of the present disclosure.
Figure 2:
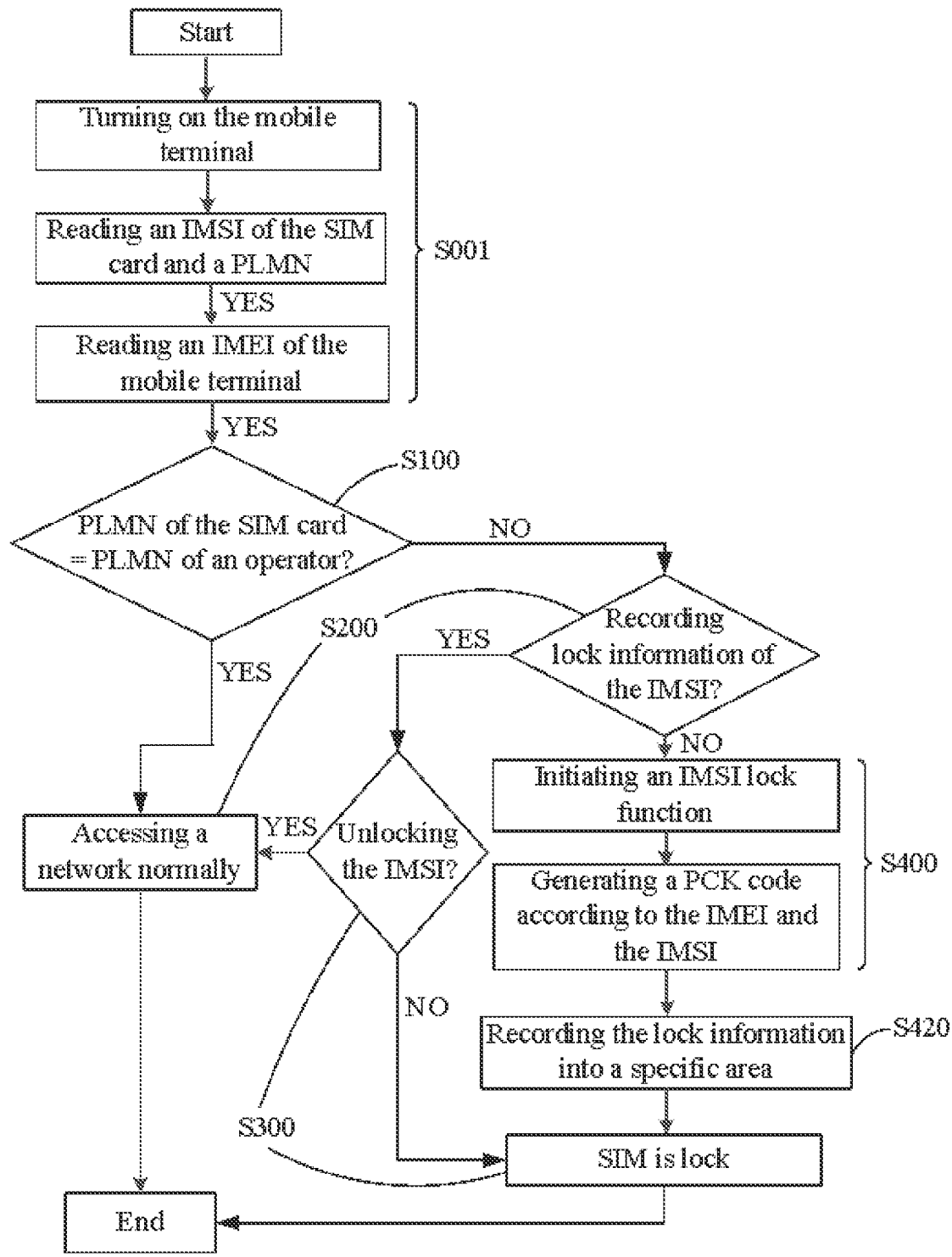
FIG. 2 illustrates a flow chart during a process of turning on a mobile terminal in accordance with an embodiment of the present disclosure.

As shown in FIG. 1 and FIG. 2, a method for unlocking a SIM card in accordance with an embodiment includes the following steps.

In step S100, a mobile terminal detects and determines whether a currently inserted SIM card belongs to a preset SIM card in compliance with a specific operator.

In a specific operation, when the mobile terminal is turned on, the mobile terminal detects and determines whether a PLMN of the currently inserted SIM card belongs to the specific PLMN.

In step S200, if yes, the mobile terminal is controlled to access a network normally. If no, lock information of an IMSI corresponding to the SIM card is detected.

In detail, when the PLMN of the SIM card belongs to the PLMN of the specific operator, the SIM card belongs to the SIM card of the operator. Accordingly, the mobile terminal can access the network normally.

When the PLMN of the SIM card does not belong to the PLMN of the specific operator, the mobile terminal cannot access the network normally. Then, it is determined whether the lock information of the IMSI corresponding to the SIM card is recorded in the mobile terminal, and a corresponding process is performed according to a lock type of the IMSI. The lock type includes a lock state and an unlock state.

In step S300, when the lock information of the IMSI exists and the lock type of the IMSI is the lock state, the SIM card is limited to access the network. When the lock information of the IMSI exists and the lock type of the IMSI is the unlock state, the mobile terminal is controlled to access the network normally.

In detail, when the lock information of the IMSI exists, the lock information is read and the lock state is determined. When the lock type of the IMSI is the lock state, the SIM card is limited to access the network and "the SIM card is locked" is displayed. When the lock type of the IMSI is the unlock state, it indicated that the SIM card is unlocked and the SIM card can access the network normally.

In step S400, when the lock information of the IMSI does not exist, a function for locking the IMSI is initiated to generate a corresponding unlock code PCK according to an IMEI of the mobile terminal and the IMSI of the SIM card.

In a specific operation, the operator generates a unique unlock code PCK according to each of IMEIs of different mobile terminals and each of IMSIs of different SIM cards. Each of the mobile terminals has a unique IMSI, and this guarantees that each of the SIM cards corresponding to a unique unlock code PCK. As such, safety of the mobile terminal is significantly enhanced.

The unlock code PCK is calculated and obtained by a predetermined algorithm. The predetermined algorithm may be an MD5 algorithm, an SHA-1 algorithm (secure hash algorithm 1), and so on. The MD5 Message Digest Algorithm is a widely used hash function in a computer security field for providing complete protection for messages.

In step S500, when the mobile terminal detects that the SIM card is locked, a user is reminded to input the unlock code PCK to control the mobile terminal to access the network normally.

Figure 3:
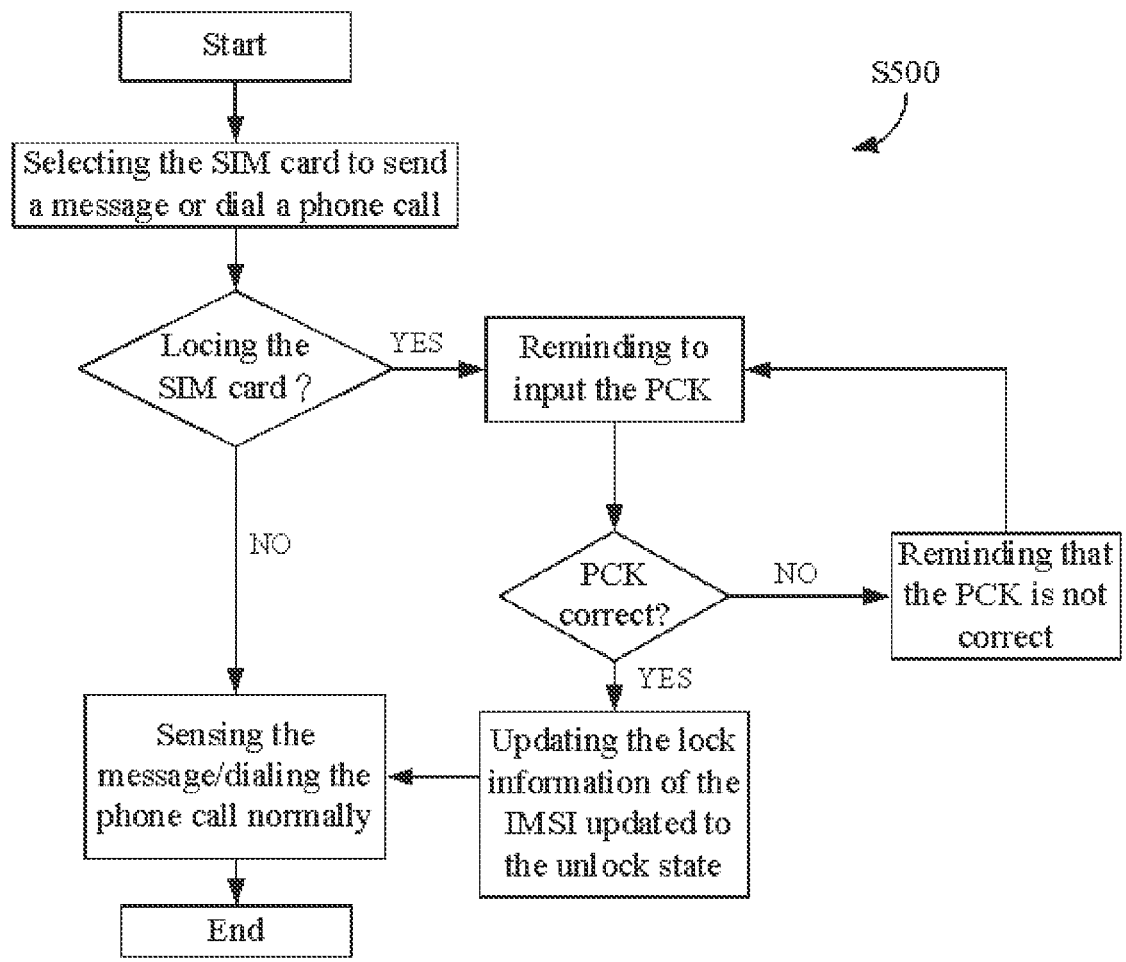
FIG. 3 illustrates a flow chart of a process when the SIM card is locked in accordance with an embodiment of the present disclosure.

In a specific operation, as shown in FIG. 3, when the user dials a phone call or sends a message but the mobile terminal detects that the SIM card is locked, the mobile terminal reminds the user that the SIM card is locked and reminds the user to input the unlock code PCK.

When the inputted unlock code PCK is correct, the lock information of the IMSI is updated to the unlock state and information of the unlock state is stored in the mobile terminal. In the meantime, the SIM card can access the network normally. When the inputted unlock code is wrong, an error input is displayed.

Further, the method further includes the following step before step S100.

In step S001, the mobile terminal is turned on and reads the IMSI of the SIM card, the PLMN, and the IMEI of the mobile terminal.

Further, step S200 specifically includes the following step.

The mobile terminal detects and determines whether the lock information of the IMSI corresponding to the SIM card is stored in the mobile terminal.

In detail, when the mobile terminal stores the IMSI, the IMSI is encrypted and stored in a specific area of the mobile terminal. The specific area may be an RPMB (replay protected memory block) area which is stored by a TEE system, so as to prevent the specific area from being modified by hackers. An encryption method may be, but is not limited to, an AES (advanced encryption standard) algorithm.

Further, the method further includes the following step after step S400.

The operator obtains the corresponding unlock code PCK and provides the corresponding unlock code PCK for the user.

That is, only the operator has the corresponding unlock code PCK for unlocking the SIM card. When the user needs the corresponding unlock code PCK, the user can contact the operator to provide the corresponding unlock code PCK.

Further, the method further includes the following step after step S400.

In step S420, the corresponding unlock code PCK and the lock type of the IMSI are encrypted and stored in a specific area.

The specific area may be an RPMB area which is stored by a TEE system, so as to prevent the specific area from being modified by hackers.

In detail, the lock type of the IMSI is described as follows. When the SIM card is inserted into the mobile terminal first time, the mobile terminal obtains the lock type of the IMSI.

The method for unlocking the SIM card of the present disclosure is not limited to a number of SIM cards supported by the mobile terminal.

An embodiment of the present disclosure further provides a mobile terminal.

Figure 4:
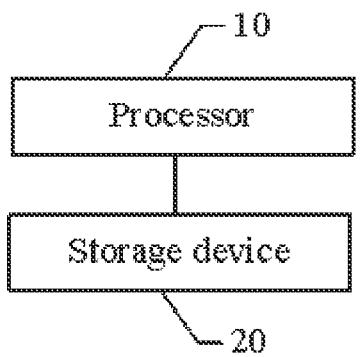
FIG. 4 illustrates a functional diagram of a mobile terminal in accordance an embodiment of the present disclosure.

As shown in FIG. 4, the mobile terminal includes a processor 10 and a storage device (memory) 20 connected to the processor. The mobile terminal includes a SIM card installed therein.

The storage device 20 stores programs configured to unlock the SIM card. The programs are executed by the processor to carry out the following steps of:

detecting and determining, by the mobile terminal, whether a currently inserted SIM card belongs to a preset SIM card in compliance with a specific operator;

controlling the mobile terminal to access a network normally if yes; detecting lock information of an IMSI corresponding to the SIM card if no;

limiting the SIM card to access the network when the lock information of the IMSI exists and a lock type of the IMSI is a lock state; controlling the mobile terminal to access the network normally when the lock information of the IMSI exists and the lock type of the IMSI is an unlock state;

initiating a function for locking the IMSI to generate a corresponding unlock code PCK according to an IMEI of the mobile terminal and the IMSI of the SIM card when the lock information of the IMSI does not exist; and reminding a user to input the unlock code PCK to control the mobile terminal to access the network normally when the mobile terminal detects that the SIM card is locked.

Further, before the step of, detecting and determining, by the mobile terminal, whether the currently inserted SIM card belongs to the preset SIM card in compliance with the specific operator, the programs are executed by the processor to carry out:

turning on the mobile terminal and reading the IMSI of the SIM card, a PLMN, and an IMEI of the mobile terminal.

Further, the step of, controlling the mobile terminal to access the network normally if yes; detecting lock information of the IMSI corresponding to the SIM card if no, specifically includes:

detecting and determining, by the mobile terminal, whether the lock information of the IMSI corresponding to the SIM card is stored in the mobile terminal.

Further, after the step of, initiating the function for locking the IMSI to generate the corresponding unlock code PCK according to the IMEI of the mobile terminal and the IMSI of the SIM card when the lock information of the IMSI does not exist, the programs are executed by the processor to carry out:

encrypting the corresponding unlock code PCK and the lock type of the IMSI and storing the corresponding unlock code PCK and the lock type of the IMSI which are encrypted in a specific area.

The operator obtains the corresponding unlock code PCK and provides the corresponding unlock code PCK for the user. An embodiment is described as above.

The present disclosure further provides a storage device.

The storage device stores programs for unlocking the SIM card. The programs are executed by the processor to perform the above-mentioned method for unlocking the SIM card. An embodiment is described as above.

In summary, in the present disclosure, the SIM card is unlocked by the unlock code PCK. An unlock tool is not required. Accordingly, it is beneficial for the user to unlock the SIM card conveniently. Furthermore, each device has a unique unlock code according to an inserted SIM card, and the unlock code is provided by an operator. As such, the present disclosure has an advantage of high safety.

It should be understood that present disclosure is not limited to the exemplary examples. Those skilled in the art in the art may achieve equivalent improvements or replacements according to the above description. The equivalent improvements and replacements should be considered to belong to the protection scope of the present disclosure.

What is claimed is:

1. A method for unlocking a SIM (subscriber identity module) card, comprising steps of:
    detecting and determining, by a mobile terminal, whether a currently inserted SIM card belongs to a preset SIM card in compliance with a specific operator;
    controlling the mobile terminal to access a network normally if yes;
    detecting lock information of an IMSI (international mobile subscriber identity) corresponding to the currently inserted SIM card if no;
    limiting the currently inserted SIM card to access the network when the lock information of the IMSI exists and a lock type of the IMSI is a lock state;
    controlling the mobile terminal to access the network normally when the lock information of the IMSI exists and the lock type of the IMSI is an unlock state;
    initiating a function for locking the IMSI to generate a corresponding unlock code according to an IMEI (international mobile equipment identity) of the mobile terminal and the IMSI of the currently inserted SIM card when the lock information of the IMSI does not exist; and
    reminding a user to input the unlock code to control the mobile terminal to access the network normally when the mobile terminal detects that the currently inserted SIM card is locked.

2. The method for unlocking the SIM card of claim 1, wherein before the step of, detecting and determining, by the mobile terminal, whether the currently inserted SIM card belongs to the preset SIM card in compliance with the specific operator, the method further comprises:
    turning on the mobile terminal and reading the IMSI of the currently inserted SIM card, a PLMN (public land mobile network), and the IMEI of the mobile terminal.

3. The method for unlocking the SIM card of claim 1, wherein the step of, controlling the mobile terminal to access the network normally if yes; detecting the lock information of the IMSI corresponding to the currently inserted SIM card if no, comprises:
    detecting and determining, by the mobile terminal, whether the lock information of the IMSI corresponding to the currently inserted SIM card is stored in the mobile terminal.

4. The method for unlocking the SIM card of claim 1, wherein after the step of, initiating the function for locking the IMSI to generate the corresponding unlock code according to the IMEI of the mobile terminal and the IMSI of the currently inserted SIM card when the lock information of the IMSI does not exist, the method further comprises:
    obtaining, by the operator, the corresponding unlock code and providing the corresponding unlock code for the user.

5. The method for unlocking the SIM card of claim 1, wherein after the step of, initiating the function for locking the IMSI to generate the corresponding unlock code according to the IMEI of the mobile terminal and the IMSI of the currently inserted SIM card when the lock information of the IMSI does not exist, the method further comprises:
    encrypting the corresponding unlock code and the lock type of the IMSI and storing the corresponding unlock code and the lock type of the IMSI which are encrypted in a specific area.

6. The method for unlocking the SIM card of claim 5, wherein the corresponding unlock code and the lock type of the IMSI are stored in an RPMB (replay protected memory block) area which is stored by a TEE system, and an encryption method is an AES (advanced encryption standard) algorithm.

7. The method for unlocking the SIM card of claim 1, wherein the unlock code is calculated and obtained by a predetermined algorithm, and the predetermined algorithm is an MD5 algorithm (MD5 message digest algorithm) or an SHA-1 algorithm (secure hash algorithm 1).

8. A mobile terminal, comprising a processor and a storage device connected to the processor, the mobile terminal comprising a currently inserted SIM (subscriber identity module) card;
    wherein the storage device stores programs configured to unlock the SIM card, and the programs are executed by the processor to carry out the following steps of:
    detecting and determining, by the mobile terminal, whether the currently inserted SIM card belongs to a preset SIM card in compliance with a specific operator;
    controlling the mobile terminal to access a network normally if yes;
    detecting lock information of an IMSI (international mobile subscriber identity) corresponding to the currently inserted SIM card if no;
    limiting the currently inserted SIM card to access the network when the lock information of the IMSI exists and a lock type of the IMSI is a lock state;
    controlling the mobile terminal to access the network normally when the lock information of the IMSI exists and the lock type of the IMSI is an unlock state;
    initiating a function for locking the IMSI to generate a corresponding unlock code according to an IMEI (international mobile equipment identity) of the mobile terminal and the IMSI of the currently inserted SIM card when the lock information of the IMSI does not exist; and
    reminding a user to input the unlock code to control the mobile terminal to access the network normally when the mobile terminal detects that the currently inserted SIM card is locked.

9. The mobile terminal of claim 8, wherein before the step of, detecting and determining, by the mobile terminal, whether the currently inserted SIM card belongs to the preset SIM card in compliance with the specific operator, the programs are executed by the processor to carry out:
    turning on the mobile terminal and reading the IMSI of the currently inserted SIM card, a PLMN (public land mobile network), and the IMEI of the mobile terminal.

10. The mobile terminal of claim 8, wherein the step of, controlling the mobile terminal to access the network normally if yes; detecting the lock information of the IMSI corresponding to the currently inserted SIM card if no, comprises:

detecting and determining, by the mobile terminal, whether the lock information of the IMSI corresponding to the currently inserted SIM card is stored in the mobile terminal.

11. The mobile terminal of claim 8, wherein after the step of, initiating the function for locking the IMSI to generate the corresponding unlock code according to the IMEI of the mobile terminal and the IMSI of the currently inserted SIM card when the lock information of the IMSI does not exist, the method further comprises:

encrypting the corresponding unlock code and the lock type of the IMSI and storing the corresponding unlock code and the lock type of the IMSI which are encrypted in a specific area; and obtaining, by the operator, the corresponding unlock code and providing the corresponding unlock code for the user.

12. The mobile terminal of claim 11, wherein the corresponding unlock code and the lock type of the IMSI are stored in an RPMB (replay protected memory block) area which is stored by a TEE system, and an encryption method is an AES (advanced encryption standard) algorithm.

13. The mobile terminal of claim 8, wherein the unlock code is calculated and obtained by a predetermined algorithm, and the predetermined algorithm is an MD5 algorithm (MD5 message digest algorithm) or an SHA-1 algorithm (secure hash algorithm 1).

14. A method for unlocking a SIM (subscriber identity module) card, comprising steps of:

reading an IMSI (international mobile subscriber identity) of a current SIM card and detecting whether the current SIM card of a mobile terminal is a preset SIM card;

detecting whether lock information of the IMSI exists if no;

initiating a function for locking the IMSI to generate a corresponding unlock code according to an IMEI (international mobile equipment identity) of the mobile terminal and the IMSI of the current SIM card when the lock information of the IMSI does not exist; and controlling the mobile terminal to access a network normally according to the corresponding unlock code when the current SIM card is locked.

15. The method for unlocking the SIM card of claim 14, wherein the step of reading the IMSI of the current SIM card and detecting whether the current SIM card of the mobile terminal is the preset SIM card further comprises:

reading a PLMN (public land mobile network) and an IMEI (international mobile equipment identity) of the mobile terminal when it is detected that the mobile terminal is turned on.

16. The method for unlocking the SIM card of claim 14, wherein after the step of initiating the function for locking the IMSI to generate the corresponding unlock code according to the IMEI of the mobile terminal and the IMSI of the current SIM card when the lock information of the IMSI does not exist, the method further comprises:

encrypting the corresponding unlock code and the lock type of the IMSI and storing the corresponding unlock code and the lock type of the IMSI which are encrypted in a specific area.

17. The method for unlocking the SIM card of claim 16, wherein the corresponding unlock code and the lock type of the IMSI are stored in an RPMB (replay protected memory block) area which is stored by a TEE system, and an encryption method is an AES (advanced encryption standard) algorithm.

18. The method for unlocking the SIM card of claim 14, wherein the unlock code is calculated and obtained by a predetermined algorithm, and the predetermined algorithm is an MD5 algorithm (MD5 message digest algorithm) or an SHA-1 algorithm (secure hash algorithm 1).

* * * * *

UNITED STATES PATENT AND TRADEMARK OFFICE
CERTIFICATE OF CORRECTION

PATENT NO. : 10,932,126 B2
APPLICATION NO. : 16/769602
DATED : February 23, 2021
INVENTOR(S) : Hanwu Xie et al.

Page 1 of 1

It is certified that error appears in the above-identified patent and that said Letters Patent is hereby corrected as shown below:

On the Title Page

Item (73) Assignee:
"JKD" should be changed to -- JRD --

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*